United States Patent [19]
Martin

[11] Patent Number: 5,254,809
[45] Date of Patent: * Oct. 19, 1993

[54] SEGMENTED FLEXIBLE HOUSING

[75] Inventor: James D. S. Martin, Dundee, Scotland

[73] Assignee: W. L. Gore & Associates, Inc., Newark, Del.

[*] Notice: The portion of the term of this patent subsequent to Nov. 20, 2007 has been disclaimed.

[21] Appl. No.: 782,580

[22] Filed: Oct. 25, 1991

[30] Foreign Application Priority Data

Oct. 26, 1990 [GB] United Kingdom ............... 9023394

[51] Int. Cl.⁵ ...................... H01B 7/24; H02G 3/04
[52] U.S. Cl. .................. 174/68.1; 174/68.3; 174/111; 174/136; 138/120
[58] Field of Search ............ 174/68.1, 111, 136, 174/68.3; 59/78.1, 78; 138/110, 120, 155

[56] References Cited

U.S. PATENT DOCUMENTS

| | | | |
|---|---|---|---|
| 470,883 | 3/1892 | Vanstone | 174/111 |
| 3,060,972 | 10/1962 | Sheldon | 138/120 |
| 4,739,801 | 4/1988 | Kimura et al. | 138/120 |

FOREIGN PATENT DOCUMENTS

| | | | |
|---|---|---|---|
| 339757 | 6/1904 | France | 174/111 |
| 1300570 | 3/1987 | U.S.S.R. | 174/136 |
| 198137 | 5/1923 | United Kingdom | 174/111 |
| 2219440 | 12/1989 | United Kingdom | . |

Primary Examiner—Leo P. Picard
Assistant Examiner—Hyung S. Sough
Attorney, Agent, or Firm—E. Alan Uebler

[57] ABSTRACT

A flexible housing for use as a cable management system for a submarine mast is capable of flexing in a plane between predetermined limits. It comprises a conduit contained within a flexible outer jacket and formed of a plurality of abutting segments, each having an opening therethrough and forming a passage for containing transmission cables or lines. Each segment has a first pair of butting surfaces at each end on one side of the passage and a second pair of butting surfaces at the other side of the passage which prevent flexing of the housing beyond predetermined limits. The segments are coupled together by a pair of endless ligament loops which pass through channels in the segments and over pulleys at each end of the housing. The segments are of bi-concave and bi-convex complementary configurations arranged alternately along the length of the conduit.

11 Claims, 1 Drawing Sheet

SEGMENTED FLEXIBLE HOUSING

BACKGROUND OF THE INVENTION

The present invention relates to a flexible housing for use in protecting one or more transmission lines (e.g. microwave cables, radio frequency cables, flexible wave guides, fibre optic cables, DC lines, high/low pressure air or hydraulic hoses and other transmission media) in a pressurised environment and in particular, a hydrostatically pressurised environment.

The invention originates from a requirement for a microwave transmission line to operate within a submarine mast environment. Modern submarine mast design dictates the placement of electronic equipment in an electronics pod at the mast head connected by microwave transmission lines to processing equipment in the hull. This arrangement creates the requirement for a microwave transmission line capable of withstanding a hydrostatic pressure of up to 1500 psi ($1.03 \times 10^7$ pascals) and yet able to flex through an angle of 180° with a bend radius of 150 mm when the mast head is raised.

In the past various "wet mast" techniques have involved the ruggedising of coaxial microwave cables so as to limit to an acceptable level the amount of hydrostatic pressure felt by the cable. Often under such pressure conditions it is the dielectric within the coaxial cable that absorbs the bulk of the compressive forces, altering the microwave characteristics of the cable. The use of a more rigid dielectric material to overcome the problem of compression under hydrostatic pressure has an adverse affect on cable performance, furthermore, this technique limits the types of cable which can be used, their number and their application and, consequently, has a limiting and detrimental affect on the design and performance of the system as a whole.

The above technique also requires the use of some form of cable management system to ensure that the cables hang and remain in a defined position (referred to as the "dip loop") under the various dynamic conditions of the submarine. Each transmission line linking the electronics pod at the mast head with the processing equipment in the hull will contain a flexure through 180°, the point of flexure being determined by the relative heights of the terminations of the transmission line and the point of flexure will thus change as the mast is raised. The cable management system not only has to allow for the smooth change in position of the point of flexure but also has to ensure that the transmission lines are unaffected by the angle of dive of the submarine, which may be of the order of ±10°, or the angle of tilt of the submarine caused by a surface swell and possibly of the order of +30°.

Since the degree of bending of the cable may of itself bring about changes in the electrical characteristics of the cable, it is desirable that the bend radius be maintained constant as far as possible.

Our published patent applications GB2219439 and 2219440 disclose flexible housings formed of individual segments, where the segments are provided with abutments to limit the degree of bending of the housing. This is desirable to avoid bending too sharply the microwave transmission lines travelling through the housing. In particular, GB2219440 discloses a flexible housing formed of alternating biconcave and cylindrical members, where abutments are provided on the leading edges of the bi-concave segments to allow for limited bending in one direction only away from the straight orientation. However, as the housing flexes, there is a danger that the jacket surrounding the segments may become pinched between the abutting surfaces of adjacent segments which may lead to damage to the jacket and possible jamming of the housing.

It is an object of the present invention to mitigate this problem, and to provide a housing capable of withstanding larger flexural forces.

SUMMARY OF THE INVENTION

The present invention provides a flexible housing capable of flexing in a plane between predetermined limits for use in protecting a transmission line in a pressurised environment, which comprises:

a conduit contained with encasing means;

the conduit being constructed of a plurality of abutting segments, each segment having an opening therethrough defining a longitudinal axis, the abutting segments being arranged in series in such a way that the opening through each segment is in communication with the openings through each of the adjacent segments so as to provide a passage to contain the transmission line, each segment being provided at each longitudinal end with first spaced-apart butting surfaces situated to one side of the opening and spaced inwardly of the external surface of the conduit the first butting surfaces of adjacent segments preventing flexing beyond one predetermined limit; and coupling means flexibly interlinking the segments.

It is preferred that the segments be of two different types arranged alternately throughout the length of the conduit. The first segment is preferably of biconcave configuration whilst the second segment is substantially cylindrical such that the two segments may hinge relative to one another. However, in a less preferred configuration a single segment type is employed having a concave hinging surface at one end and a convex hinging surface at the other end.

It is also advantageous to employ second butting surfaces also spaced inwardly of the external surface of the conduit in order to prevent flexing beyond the other predetermined limit, and arranged at the opposite side of the opening. The predetermined limits of flexing will be chosen according to the desired minimum bend radius of the housing in each direction of bending away from the straight orientation. In a preferred embodiment, the first and second butting surfaces allow the housing to flex between the straight configuration (0°) and an angle of 10° to 20° (preferably 12°-15°) from the straight orientation. The minimum bend radius for use in a submarine is generally in the region of 120 to 200 mm. The minimum bend radius will also depend on the width of the segments considered in the plane of flexing and generally speaking the minimum bend radius will be twice the width of the segment.

In order to minimise potential stress points on the encasing means, and to improve overall pressure resistance, it is preferred that the housing be non-square in cross-section. Usually, the corners will be taken off so as to provide a generally octagonal cross-section, though other polygonal or rounded cross-sections are also possible. In order to prevent lateral movement of the segments in a direction perpendicular to the plane of flexing, it is preferred to provide co-operating guide surfaces on adjacent segments, preferably in the form of inclined radial abutments at either end of the butting surfaces. The radial abutting surfaces are usually inclined at 30° to 60° to the plane of flexing.

The coupling means are usually in the form of continuous ligaments running the full length of the flexible housing and formed of a material resistant to stretching, such as Kevlar (Trade Mark) or stainless stool Bowden cable. Ideally, the ligaments are spaced as far as practical from the longitudinal axis in order to give the best mechanical advantage, and to maximise the permitted size of the opening. In a particularly preferred embodiment, four ligaments are provided, two on each side of the passage, running through dedicated channels in each segment. As the housing flexes from a straight to a bent configuration, the length of the outer ligament of each pair (considered in the plane of flexing) will tend to increase while the length of the inner ligament will tend to decrease correspondingly. In order to allow for this, it is preferred that the inner and outer ligaments for each pair be joined together into an endless loop at each end of the flexible housing. It is particularly advantageous to provide a pulley or curved guide surface at each end of the housing to accommodate movement of the endless ligament. This arrangement has the particular advantage that the tension in the coupling means may be set with the housing in the straight configuration prior to installation.

The segments themselves are preferably formed of a structural reinforced plastic, such as a carbon fibre reinforced liquid crystal polymer. Possibly adjacent segments might be formed of dissimilar materials in order to improve the bearing properties and reduce noise.

The encasing means will generally be in the form of a tubular elastomeric material around the segments, possibly shrunk in place. In a preferred embodiment, the encasing means is in the form of a wrap of PTFE taps or braid applied over the segments, before application of an elastomeric rubber outer jacket.

The flexible housing is intended to act as a cable management system to accommodate microwave cables, flexible microwave wave guides, radio frequency cables, fibre optic cables, electric cables, hydraulic or pneumatic lines etc. which require to be protected, managed and preferably pressure proofed. The present invention is capable of substantially isolating such lines from external hydrostatic or pneumatic pressures in a leak proof manner. It is also capable of managing the dip loop in a submarine under a variety of operational submarine conditions.

BRIEF DESCRIPTION OF THE DRAWINGS

An embodiment of the present invention will now be described by way of example only with reference to the accompanying drawings wherein.

DETAILED DESCRIPTION OF THE INVENTION AND PREFERRED EMBODIMENTS WITH REFERENCE TO THE DRAWINGS

Figure 1:
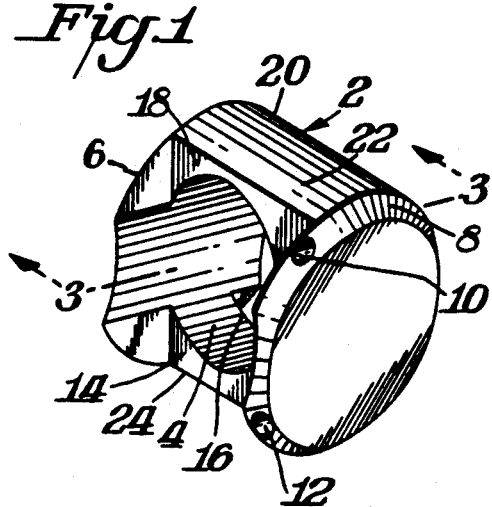
FIG. 1 is a perspective view of a first substantially cylindrical segment.

FIG. 1 shows a first substantially cylindrical segment 2 having a generally longitudinal opening 4 extending therethrough for accommodating a microwave cable etc. At either lateral side of the opening are provided frusto conical chamfered guide surfaces 6, 8 inclined at substantially 45°, which act as bearing surfaces and also maintain lateral alignment of the segments. These chamfered guide surfaces also enable the conduit to be of octagonal cross-section, the benefits of which are explained later. Each chamfer contains a pair of longitudinally extending channels 10, 12 spaced equally at either side of the longitudinal axis of the segment to accommodate tensioning ligaments. A corresponding pair of channels (not shown) is provided in the chamfer 6.

A pair of longitudinally spaced first butting surfaces 18, 20, arranged substantially perpendicular to the longitudinal direction of the segment, are arranged above the opening 4.

The segment 2 is also provided with a second longitudinally spaced pair of butting surfaces 14, 16 extending substantially perpendicular to the longitudinal direction for providing a limit (i.e. 0°) to the degree of flexing in one direction.

The segment is also provided with part-cylindrical upper and lower bearing surfaces 22, 24.

Figure 2:
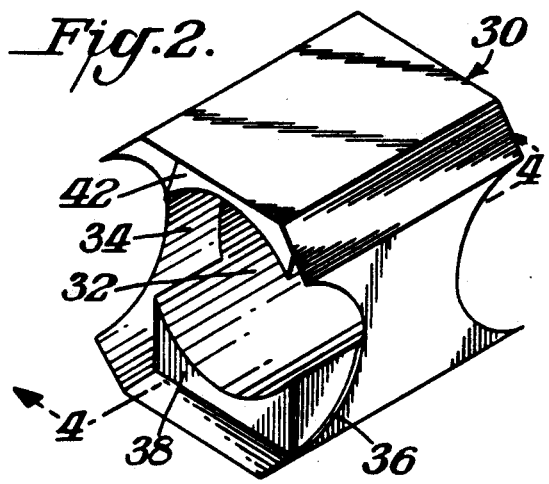
FIG. 2 is a perspective view of a second substantially bi-concave-segment.
Figure 3:
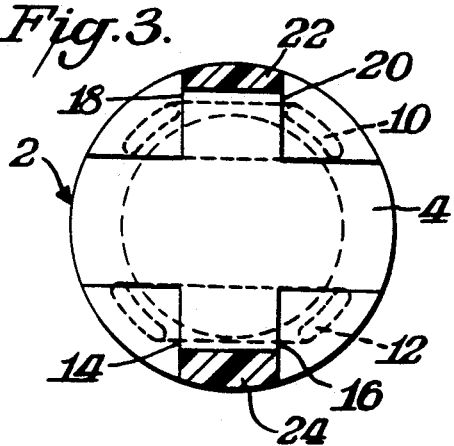
FIG. 3 is a vertical cross section through the first substantially cylindrical segment.

FIG. 2 shows the second biconcave segment 30 having an opening 32 therethrough to accommodate a microwave cable etc. on either lateral side of the opening are provided inwardly inclined frusto-conical bearing surfaces 34,36 (a corresponding pair of surfaces being provided at the other end of the segment but not being shown). These surfaces are inclined at substantially 45° and co-operate with bearing surfaces 6,8 on the first segment so as to allow hinging sliding movement.

A pair of first longitudinally spaced apart abutting surfaces 42,44 are provided above the opening. These surfaces are inclined at approximately 13° to the vertical and co-operate with corresponding butting surfaces 18, 20 on the first segment to limit the permitted flexing between adjacent segments to 13°.

A second longitudinally spaced pair of butting surfaces 38, 40 are provided below the opening. In the embodiment shown, these surfaces are arranged substantially perpendicular to the longitudinal direction of the segment, so that when they abut corresponding surfaces 14, 16 on the first segment a limit of 0° is imposed on the permitted degree of flexing in that direction.

The second segment is also provided with part cylindrical surfaces 46, 48 and 50, 52 which co-operate with corresponding bearing surfaces 24 and 22 on the first segment.

Figure 4:
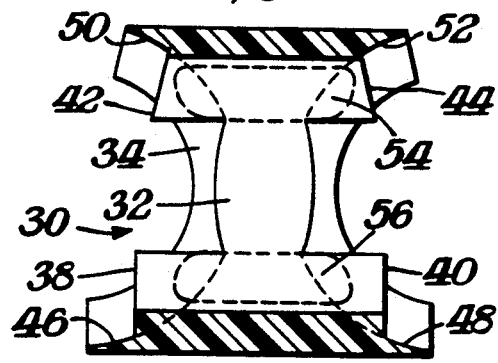
FIG. 4 is a vertical cross section through the second biconcave segment.

Channels 54, 56 (see FIG. 4) are provided in the chamfered bearing surfaces 36. A corresponding pair of channels (not shown) is provided in chamfered surface 34 to accommodate tensioning ligaments.

The outer surface of the segment is substantially octagonal so as to give a smooth outline. This minimises sharp corners which could damage the outer jacket, and thus improves the flexing life of the jacket. The octagonal cross-section also improves the pressure withstanding abilities of the housing.

Figure 5:
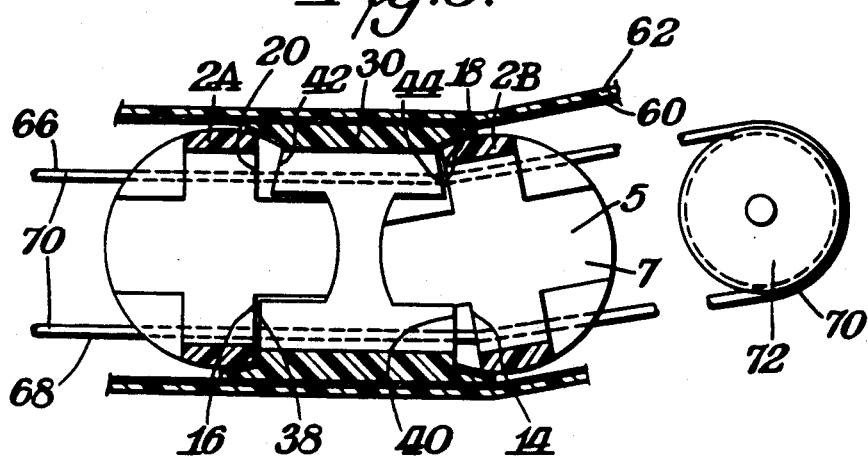
FIG. 5 is a vertical cross section through a group of three segments forming part of a flexible housing.

FIG. 5 shows part of a flexible housing made up of three segments 2a, 30, 2b, whose openings are aligned to form a conduit 5 having a passage 7. Segments 2a and 30 are aligned in a straight orientation, whilst segment 2b is flexed relative to segment 30 for illustrational purposes. In addition, the flexible housing comprises an inner sleeve 60 formed of PTFE tape wrapped around the interlinked segments, with a shrink-fitted outer jacket 62 of elastomeric material.

The segments are interlinked by an endless ligament 70 formed of two runs 66,68 of Kevlar passing through the channels on one side of the segments. A further ligament (not shown) passes through the channels on the other side of the segments. In order to allow flexing of the flexible housing, the endless ligament passes around a pulley 72 disposed at each end of the flexible housing. If required, screw or jack means may be provided for moving the pulley away from the rest of the flexible housing in order to set the tension in the ligament.

Whilst a particular arrangement has been illustrated in the drawings, it will be clear to the man skilled in the art that other analagous arrangements are equally possible. For example, the inclined butting surfaces may be provided on either of the segment types.

The flexible housing operates as follows. In its straight orientation, perpendicular butting surfaces 16, 38 abut one another and prevent further banding in that direction. Flexing from that position may occur in the other direction until first butting surfaces 44, 18 contact one another, when a bend of 13° has occurred. At this maximum bend, the outer edges of part cylindrical surfaces 50, 52 still remains spaced apart, so that there is no danger of the jacket 60, 62 becoming nipped between these edges. The minimum bend is set by the internal abutting surfaces, whose relatively large surface area is able to absorb substantial loads. Since these internal abutting surfaces are spaced inboard of the edges of the segments, there is no danger of damage to the jacket on flexing. As the housing is flexed from a straight orientation to a bent orientation, the inner run of endless ligament 70 shortens whilst the outer run lengthens, and this relative movement is accommodated by motion around the pulley 72. This enables the housing to be supplied in a straight orientation and then bent at the time of installation.

In this way, the housing is able to flex between predetermined limits without any danger of excessively bending the cables running through it, whilst at the same time isolating the cables from external pressure and being leak proof. The built-in limits to the bend radius ensure that the degree of flexing is controlled under all conditions of tilt or yaw of the submarine.

While the invention has been disclosed herein connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A flexible housing capable of flexing in a plane between predetermined limits for use in protecting a transmission line in a pressurised environment, which comprises:
   a conduit contained within encasing means; the conduit being constructed of a plurality of abutting segments, each segment having an opening therethrough defining a longitudinal axis, the abutting segments being arranged in series in such a way that the opening through each segment is in communication with the openings through each of the adjacent segments so as to provide a passage to contain the transmission line, each segment being provided at each opposed longitudinal end with a first butting surface situated to one side of the opening and spaced inwardly of the external surface of the conduit, the first butting surfaces of adjacent segments preventing flexing beyond one predetermined limit; and coupling means flexibly interlinking the segments, wherein the coupling means comprises first and second continuous non-stretching ligaments which pass through channels provided respectively on each side of the opening of each segment, the channels lying in a plane which is substantially parallel to the plane of the flexing of the conduit; the first and second ligaments being connected together at the ends of the housing to form an endless loop.

2. A flexible housing according to claim 1 wherein each segment is additionally provided at each opposed longitudinal end with a second butting surface situated at the opposite side of the opening to said first butting surface and also spaced inwardly of the external surface of the conduit; the second butting surface of adjacent segments preventing flexing beyond a second determined limit at the opposite end of flexing travel to the first predetermined limit.

3. A flexible housing according to claim 1 wherein the abutting segments are of two types, a first segment type and a second segment type arranged alternately along the length of the conduit; the segment types having complementary curved bearing surfaces to provide for said flexing of the conduit, the first segment type being of bi-convex configuration and comprising a convex bearing surface at each opposed longitudinal end thereof, and the second segment type being of biconcave configuration and comprising a concave bearing surface at each opposed longitudinal end thereof.

4. A flexible housing according to claim 1 wherein the butting surfaces are so positioned as to allow the housing to flex at an angle of 10 to 20 degrees between adjacent segments from a straight orientation.

5. A flexible housing according to claim I wherein the external shape of the conduit is octagonal in cross-section.

6. A flexible housing according to claim 1 which further comprises cooperating guide surfaces on adjacent segments for preventing lateral relative movement of the segments, the guide surfaces comprising inclined radial abutments at either side of each butting surface and lying in a plane parallel to a plane of flexing of the conduit.

7. A flexible housing according to claim 6 wherein the radial abutments are inclined at an angle of 30° to 60° to said plane of flexing of the conduit.

8. A flexible housing according to claim 1 wherein a curved guide means is provided at each end of the housing for guiding the endless ligament and allowing movement thereof during flexing of the conduit.

9. A flexible housing according to claim 1 which comprises a pair of endless ligament loops located in substantially parallel planes on each side of the passage.

10. A flexible housing according to claim 1 wherein the encasing means comprises an inner layer formed of a polyttetrafluoroethylene (PTFE) containing tape and an elastomeric outer jacket.

11. A flexible housing according to claim 1 wherein the encasing means comprises an inner layer formed of a polytetrafluoroethylene (PTFE) containing braid and an elastomeric outer jacket.

* * * * *